July 14, 1931.  T. SAKI  1,814,096
VARIABLE SPEED DRIVE MECHANISM
Filed June 16, 1930
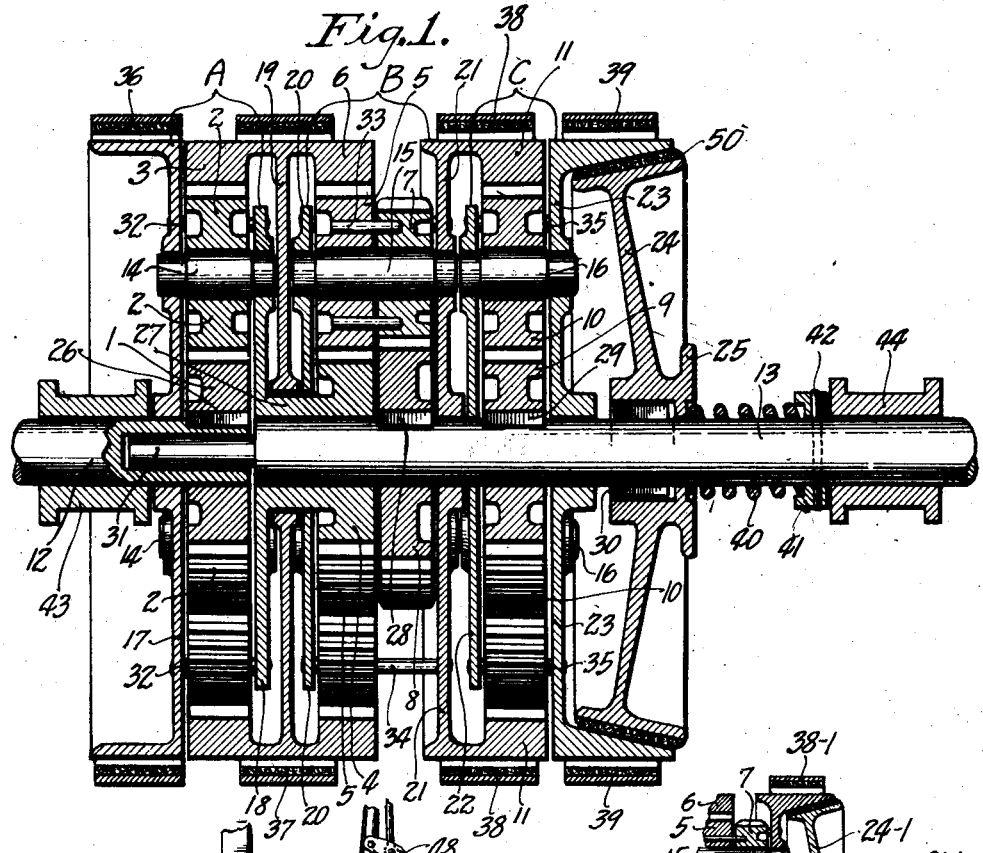
Inventor:
Tossy Saki, Patented July 14, 1931

1,814,096

UNITED STATES PATENT OFFICE

TOSSY SAKI, OF SALT LAKE CITY, UTAH

VARIABLE SPEED DRIVE MECHANISM

Application filed June 16, 1930. Serial No. 461,580.

This invention relates to a variable speed drive mechanism, and its principal objects are:

First. To apply in a practical manner the principle involved in my improved power saving device for which an application for U. S. patent was filed May 14, 1929, Serial No. 363,022, so that at the lowest speed of the driven shaft of the mechanism, the greatest saving of power may be realized and therefore the greatest efficiency.

Second. To afford in general, a high efficiency.

Third. To change the speed of the driven shaft without shifting gears.

Fourth. To bring about a maximum loading at the desired speed by means which may be applied gradually, in contradistinction from mechanisms where the load is applied suddenly.

Fifth. To start the prime mover at zero load and apply the maximum load without resorting to any means outside of the present mechanism itself.

Sixth. To avoid damage to the prime mover by stoppage of the driven shaft.

Seventh. To be simple and compact.

The features of this invention for which the protection of Letters Patent of the United States is desired, are collectively grouped in the claims concluding this specification.

In the drawings, which illustrates one desirable embodiment of this invention,

Fig. 1 represents a center section taken along the axis of rotation;

Fig. 2, a fragmentary portion of a similar section, but showing modifications, drawn to a reduced scale;

Fig. 3, a fragmentary side elevation showing the application of a shifting mechanism to the main structure, this figure being drawn to a scale somewhat smaller than the scale of Fig. 1, but larger than the scale of Fig. 2; and Fig. 4, a section taken on line 4—4, Fig. 3.

Referring to the drawings, the numeral 12 designates a shaft journaled in a bearing 43 and receiving power from any suitable source, such as an internal combustion engine, not shown. A driven shaft 13 journaled in a bearing 44 may have the integral extension 31 journaled in a suitable recess in the end of the driving shaft 12, the two shafts being substantially in axial alignment with each other.

Rigidly mounted on the shaft 12, for instance by means of a key 26, is a sun gear 1. Meshing with the sun gear are planetary gears 2, the latter being mounted on individual planetary shafts 14.

A wheel 17 rotatably mounted on the shaft 12, and a disk 18 provided with a hub 27 rotatably mounted on the shaft 13 are rigidly connected with each other by means of pins 32, and may be termed a cage or carrier (A). The individual shafts 14 carry planetary gears 2 and are supported in the wheel 17 and in the disk 18.

Meshing with the planetary gears 2 is an internal gear 3 formed in one flange of a double flanged wheel 19, in the second flange of which, is formed an internal gear 6, the wheel 19 being rotatably mounted on the hub 27 of a sun gear 4, which latter is rigid with respect to the hub 27. Meshing with the sun gear 4 and with the internal gear 6, are planetary gears 5, and fastened to the gears 5 by means of pins 33, are planetary gears 7, the latter, together with the gears 5, being mounted on planetary shafts 15. It will be clear, that instead of being connected by the pins 33, the gears 5 and 7 may be made integral with each other in accordance with the usual practice which it is not necessary to illustrate here, the purpose being to form what may be termed "duplex gears".

Supporting the shafts 15, are the disk 20 rotatably mounted on hub 27, and the flanged wheel 21 rotatably mounted on the shaft 13, the disk and wheel being rigidly connected to each other by means of pins 34 to form the cage or carrier (B).

Meshing with the plantary gears 7 is a sun gear 8, the latter being rigidly mounted on the driven shaft by means of a key 28. The wheel 21 may be flanged and may carry the internal gear 11, which latter meshes with planetary gears 10 mounted on individual planetary shafts 16, the latter in turn meshing with the sun gear 9, which may be rigidly mounted on the shaft 13 by means of a key 29. The planetary shafts 16 are supported in a disk 22 and in a wheel 23, both of which are rotatable on the shaft 13 and are connected to each other by means of pins 35 to form a cage or carrier (C). The wheel 23 has a suitable flange, the purpose of which will presently appear.

Mounted on the shaft 13 so as to have a limited sliding motion back and forth thereon, is a wheel 24, the hub of which may have blind keyways formed therein so as to engage a key 30, which latter forms substantially a double-acting sliding feather. The rim of the wheel 24 may have the form of the frustum of a cone provided with a frictional face 50 so as to engage the inside of the flange carried by the wheel 23, such engagement being effected by a compression spring 40 encircling the shaft 13 against a collar 41 rigidly mounted on shaft 13 by means of pins 42.

In order to hold the wheel 24 out of engagement with the wheel 23, a mechanism described immediately hereinafter, may be employed. This mechanism consists of a lever journaled on a suitable stationary pin 49, and having an upwardly extending operating arm 46 together with a shorter arm 45, which latter may be forked, and at its outer extremities carry fingers 51 projecting into an annular groove formed between the body of the wheel 24 and a flange 25 integral with the wheel.

The arm 46 may be operated to move wheel 24 out of engagement with wheel 23, and be held against the urge of the spring 40 by means of a pawl 48 engaging a stationary ratchet 47. Thus the wheel 24 forms a clutch for the wheel 23, but it will be obvious that a clutch of any other design could be employed.

The numerals 36 to 39 designate clutch bands or friction grips which are disposed to engage the respective wheels 17, 19, 21 and 23, and are operable independently from one another by any usual means, such as levers with pawls engaging ratchets (not shown).

If desired, the carrier (C) and the clutch band 39 may be omitted, and wheel 21 be made of a form adapted for engagement by the clutch wheel 24, as illustrated in Fig. 2, where the wheel 21 has its modified counterpart in the wheel 21—1, this being shown connected to disk 22 by means of pins 34—1. Here, the clutch 24—1 with its double-acting feather 30—1, flange 25—1, compression spring 40—1, pin 42—1, journal 44—1, and driven shaft 13—1, are all counterparts of the parts mentioned in connection with the mechanism hereinbefore mentioned.

Operation

In order to start the prime mover (not shown), operative upon the shaft 12, under zero load, all the bands 36 to 39 are kept out of engagement with their respective wheels. At the same time, the clutch wheel 24 is kept out of engagement with the wheel 23 by moving the arm 46 to the left. Now, assuming the prime mover to be started, rotating the sun gear 1 in the clockwise direction, the planetary gears 2 will be rotated in the counterclockwise direction and also have planetary motion in the clockwise direction, causing the internal gear 3 to rotate counterclockwise at a speed proportional to the magnitude of the sum of the forces which react on the shaft 14. The planetary motion of gears 2 causes the carrier (A) with sun gear 4 to rotate clockwise, while the internal gear 6 with internal gear 3 rotates counterclockwise. As the duplex gears 5 and 7 are driven by both the gears 4 and 6, the duplex gears will rotate counterclockwise.

Supposing the shaft 13 to be loaded, then the duplex gears 5—7 tend to have planetary motion in the counterclockwise direction, due to the reaction on shafts 15, whereby the duplex gears 5—7 may have planetary motion proportional to the sum of the reaction on shafts 15 without driving the sun gear 8. The internal gear 11 will naturally have the same directional rotation as the planetary motion of duplex gears 5—7.

As the planetary gears 10 are driven by the internal gear 11, the former will rotate and have planetary motion in the counterclockwise direction. The planetary motion of gears 10 and therefore rotary motion of carrier (C) does not affect rotation of shaft 13, so long as retardation of the planetary motion of gears 10 does not occur.

In order that rotation may be imparted to the shaft 13, with gradual loading of the latter, the clutch band 39 is tightened to engage the wheel 23, which retards the planetary motion of gears 10, finally bringing this planetary motion to a stop and allowing rotation only of these gears, thereby effecting the rotation of sun gear 9 together with shaft 13, in the clockwise direction. The rotation of shaft 13, through sun gear 8, reduces the planetary motion of duplex gears 5—7, causing the latter to assume rotary motion also.

The power stress of duplex gears 5—7 acts directly upon the sun gear 8, and the reactional stress acts indirectly upon the sun gear 9 being concentrated upon the shaft 13, thereby effecting the lowest speed of which this device is capable, in the clockwise direction. A point may be reached where the power stress and reactional stress of duplex gears 5—7 are equal to each other.

To obtain a second and therefore a higher speed of the shaft 13, the clutch band 39 is first released, then the clutch band 38 is tightened on the wheel 21, whereby the planetary motion of duplex gears 5—7 is finally brought to a stop, upon which the duplex gears have rotary motion only. The power in duplex gears 5—7 drives the sun gear 8 and causes the rotation of shaft 13 at the previously mentioned higher speed in the clockwise direction.

A third speed of the shaft 13 is obtained by releasing the clutch band 38 and applying the clutch band 37 on wheel 19, thereby bringing the internal gears 3 and 6 to a stop and causing all the planetary gears to have clockwise planetary motion, thus effecting the rotation of the shaft 13 at the said higher speed in the said clockwise direction.

To reverse the rotation of shaft 13, the brake band 36 is tightened on wheel 17, whereby planetary motion of gears 2 will cease, and the counterclockwise rotation of gears 2 will cause the counterclockwise rotation of internal gears 3 and 6. The rotation of internal gear 6 will then cause the counterclockwise rotation and planetary motion of gears 5—7, thereby causing the counterclockwise rotation of gear 8 and hence of shaft 13.

In order to give shaft 13 the same speed as shaft 12, the bands 36 to 39 are released from engagement with their respective wheels, the clutch 24 however, being moved into engagement with the wheel 23, whereby the locking of the gears 9, 10 and 11 will cause the rotation of the entire mechanism as a unit.

The disengagement of the clutch 24 from the wheel 23 will cause the idling of the various wheels and gears without rotating the shaft 13.

It will be apparent that by means of the modified construction shown in Fig. 2, the driven shaft will have three speeds instead of four in the clockwise direction.

The present invention is applicable not only as a transmission for automobiles and the like, but is also peculiarly advantageous in the driving of power shovels, as well as trains of rolls in rolling mills, where extremely slow speed is required in the driven shafts with resulting high torque, together with quick direction reversals in directional rotation.

While a specific embodiment of my invention is herein shown and described, it is to be understood that various changes could be made therein without departing from the spirit and scope of the invention as defined in the claims.

Having fully described my invention, what I claim is:

1. A variable speed drive mechanism, including in combination, a drive shaft, a driven shaft in substantial axial alignment therewith, a sun gear rigidly mounted on said drive shaft, planetary gears in mesh with said sun gear, an internal gear in mesh with said planetary gears, a carrier rotatable due to planetary motion of said planetary gears, a second sun gear, said second sun gear rigidly connected with said carrier; duplex planetary gears in mesh with said second sun gear, a second internal gear, said second internal gear in mesh with said duplex planetary gears and rigidly connected with the first internal gear, a third sun gear, said third sun gear in mesh with said duplex planetary gears, and rigidly mounted on said driven shaft; a second carrier, said second carrier rotatable due to planetary motion of said duplex planetary gears; a fourth sun gear, said fourth sun gear rigidly mounted on said driven shaft, secondary planetary gears in mesh with said fourth sun gear; a third internal gear, said third internal gear in mesh with said secondary planetary gears and rigidly connected with said second carrier; a third carrier, said third carrier rotatable due to the planetary motion of said last-mentioned planetary gears; a clutch operable to engage the said third carrier, said clutch mounted on said driven shaft, means for selectively preventing planetary motion of said first-mentioned planetary gears, means for selectively preventing the rotation of said first and second internal gears, means for selectively preventing planetary motion of said duplex planetary gears, means for selectively preventing planetary motion of the last-mentioned planetary gears, means for holding said clutch from engagement with said third carrier, and means for locking up said third carrier with said clutch.

2. In combination, a sun gear, planetary gears in mesh with said sun gear, an internal gear in mesh with said planetary gears, a carrier rotatable due to planetary motion of said planetary gears; a second sun gear, said second sun gear rigidly connected with said carrier; duplex planetary gears in mesh with said second sun gear, a second internal gear, said second internal gear in mesh with said duplex planetary gears and rigidly connected with the first internal gear; a third sun gear, said third sun gear in mesh with said duplex planetary gears; a second carrier, said second carrier rotatable due to planetary motion of said duplex planetary gears; a fourth sun gear, an element rigidly connecting said fourth sun gear with said third sun gear; other planetary gears in mesh with said fourth sun gear; a third internal gear, said third internal gear in mesh with the last-mentioned planetary gears and rigidly connected with said second carrier; and a third carrier, said third carrier having rotation due to planetary motion of the last-mentioned planetary gears.

3. In combination, a driven shaft, a sun gear rigidly mounted thereon, planetary gears in mesh with said sun gear, a carrier having rotation independent of said shaft, the said rotation of carrier being due to planetary motion of said planetary gears; an internal gear rigidly disposed on said carrier; other planetary gears in mesh with said internal gear; a second carrier, said second carrier having rotary motion due to the planetary motion of the last-mentioned planetary gears; means for selectively holding said second carrier against rotative motion; a second sun gear, said second sun gear rigidly mounted on said driven shaft and in mesh with the last-mentioned planetary gears, a drive shaft in substantial axial alignment with said driven shaft, and means for transmitting motion from said drive shaft to the first-mentioned planetary gears.

4. In combination, a driven shaft, a sun gear rigidly mounted thereon, planetary gears in mesh with said sun gear, a carrier having rotation due to planetary motion of said planetary gears; an internal gear rigidly disposed on said carrier, other planetary gears in mesh with said internal gear; a second carrier having rotary motion due to planetary motion of the last-mentioned planetary gears; a second sun gear, said second sun gear in mesh with the last-mentioned planetary gears and rigidly mounted on said driven shaft; a clutch operable to engage with the second carrier, said clutch mounted and axially movable upon said driven shaft, and means for locking up said clutch with the second carrier.

5. In combination, a driven shaft, a sun gear rigidly mounted thereon, planetary gears in mesh with said sun gear, a carrier rotatable by means of said planetary gears; an internal gear rigidly connected with said carrier; other planetary gears in mesh with said internal gear; a second sun gear in mesh with the last-mentioned planetary gears and rigidly mounted on said driven shaft; a second carrier, said second carrier rotatable by the planetary motion of the last-mentioned planetary gears; a clutch operable to engage the second carrier, said clutch mounted and axially movable upon said driven shaft; a drive shaft in substantial axial alignment with said driven shaft, and means for transmitting motion from said drive shaft to said driven shaft.

6. A variable speed drive mechanism, including in combination, a sun member, planetary members deriving motion from said sun member, means for supporting said planetary members, holding means to control the planetary motion of said planetary members, duplex planetary members spaced axially apart from the first-mentioned planetary members, means for rotatably supporting said duplex planetary members, means for transmitting motion from the first-mentioned supporting means to said duplex planetary members, braking means to control transmission of motion from the first-mentioned supporting means to said duplex planetary members; secondary braking means to control planetary motion of said duplex planetary members; a secondary sun member deriving motion from said duplex planetary members, other planetary members, means for transmitting motion from said duplex planetary member-supporting means to said other planetary members, a sun member deriving motion from said other planetary members, a driven member rigidly connected to the last-mentioned sun member and said secondary sun member, braking means to control said other planetary members, and means for locking up said other planetary members with said driven member.

7. The combination, in a three-speed transmission gear assembly, of a drive shaft having a driving gear, with a driven shaft in substantial axial alignment with said drive shaft, planetary members deriving motion from said driving gear, means for rotatably supporting said planetary members, duplex planetary members spaced axially apart from said planetary members, means for simultaneously transmitting motion in two lanes to said duplex planetary members, controlling means to transmit motion by one of said two lanes to said duplex planetary members, means for rotatably supporting said duplex planetary members, means for controlling planetation of said duplex planetary members, means for transmitting motion from said duplex planetary gears to said driven shaft, and a clutch mounted on said driven shaft, said clutch being operable to lock said driven shaft with the last-mentioned rotatable supporting means.

8. The combination, in a four-speed transmission gear assembly, of a drive shaft having a driving gear, with a driven shaft in substantial axial alignment with said drive shaft, planetary members deriving motion from said driving gear, means for rotatably supporting said planetary members, duplex planetary members spaced axially apart from said planetary members, means for simultaneously transmitting motion in two lanes to said duplex planetary members, controlling means to transmit motion by one of said two lanes to said duplex planetary members, means for rotatably supporting said duplex planetary members, means for preventing planetation of said duplex planetary members, other planetary members, means for transmitting motion from said second-mentioned rotatable supporting means to said other planetary members, means for rotatably supporting the last-mentioned planetary members, means for controlling planetation of the last-mentioned planetary members, means for simultaneously transmitting motion from said duplex planetary members and last-mentioned planetary members to said driven shaft; and a clutch mounted on said driven shaft, said clutch being operable to lock said driven shaft with the last-mentioned rotatable supporting means.

9. In combination, a drive shaft, a driven shaft in substantial axial alignment therewith, a sun gear rigidly mounted on said drive shaft, planetary gears in mesh with said sun gear, an internal gear in mesh with said planetary gears, a carrier rotatable due to planetary motion of said planetary gears, a second sun gear, said second sun gear rigidly connected with said carrier, duplex planetary gears in mesh with said second sun gear, a second internal gear, said second internal gear in mesh with said duplex planetary gears and rigidly connected with said first internal gear, a third sun gear, said third sun gear in mesh with said duplex planetary gears and rigidly mounted on said driven shaft, a second carrier, said second carrier rotatable due to planetary motion of said duplex planetary gears, a clutch operable to engage the last-mentioned carrier, said clutch mounted on said driven shaft, means for selectively preventing planetary motion of said first-mentioned planetary gears, means for selectively preventing the rotation of said first and second internal gears, means for selectively preventing planetary motion of said duplex planetary gears, means for holding said clutch out of engagement with said second carrier, and means for locking said second carrier with said clutch.

In testimony whereof, I sign my name hereto.

TOSSY SAKI.